UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 568,105, dated September 22, 1896.

Application filed July 23, 1896. Serial No. 600,240. (No specimens.)

*To all whom it may concern:*

Be it known that I, JOHN H. STEVENS, a citizen of the United States, residing in the city of Newark, county of Essex, and State of New Jersey, have invented certain new and useful Improvements in Pyroxylin Compounds, of which the following is a specification.

As to the art I refer to my United States Patents No. 517,987, of April 10, 1894; No. 542,692, of July 16, 1895; No. 543,108, of July 23, 1895, and No. 559,823, of May 12, 1896.

The present invention has for its object the manufacture of new compositions of matter by the use of certain new solvent substances in connection with soluble pyroxylin. These new solvents have special characteristics, and if used according to my instructions will give new and valuable effects. They consist of the group of substances known as the "citric esters of the monohydric monatomic aliphatic alcohols," including methyl, ethyl, propyl, and butyl citrates.

Trimethyl citrate, $C_6H_5O_7(CH_3)_3$, is a solid substance which, when pure, melts at 78.5° centigrade.

Triethyl citrate, (normal ethyl citrate,) $C_6H_5O_7(C_2H_5)_3$, is a liquid.

Tripropyl citrate, $C_6H_5O_7(C_3H_7)_3$, is a liquid.

Triïso-butyl citrate, $C_6H_5O_7(C_4H_9)_3$, is also a liquid.

The group also comprises modifications of these esters, such, for instance, as trichlorethyl citrate, $C_6H_2O_4.Cl_3.(C_2H_5)_3$, and acetyl-triethylcitric ether, $(C_2H_3O_2.CO_2.C_2H_5).C(CH_2.CO_2.C_2H_5)_2$.

The trimethyl citrate is a solvent of pyroxylin when melted by means of heat. It is sparingly soluble in the usual menstrua. When it is desired to use it alone as the solvent, it is best to employ the solid process of conversion, or it can be used with a strong solvent, like wood-spirit, and the compound freed from the wood-spirit by appropriate seasoning. The special value of the trimethyl citrate as a solid solvent lies in the fact that the compounds made with it are not easily affected by alcohol or other solvents which readily attack pyroxylin compounds on account of their affinity for the solid solvent present. Trimethyl citrate can be used in connection with camphor as a solid solvent, but, while it enables the camphor solvent to act at a lower temperature than usual, its sparingly-soluble nature is still manifested in these combinations. I do not recommend it for thin solutions of pyroxylin unless it be combined with large excess of camphor or equivalent easily-soluble solid solvent.

Normal ethyl citrate (triethyl citrate) is useful wherever a slowly-volatile solvent is desired. A pyroxylin combination made with it does not dry rapidly, and is therefore flexible and can be easily manipulated while freely exposed to the air. The normal ethyl citrate is a good solvent for acetanilid and is a very useful heavy solvent to be employed therewith. It is especially valuable in combination with acetanilid in making rolling compounds or stiff masses or materials.

Tripropyl citrate resembles the ethyl citrate in its action, and, like that substance, can be used in all forms of pyroxylin compounds. It is especially valuable in making solutions to be spread on surfaces to form films, which are clear, uniform, and easily managed.

Triïso-butyl citrate resembles the tripropyl citrate, but my experience shows that it is more inclined to be dark-colored.

All of the citrates are colorless substances when pure, but those having the higher boiling-points are difficult to obtain or produce in a colorless condition. All of these citrates form active solvents when mixed with ninety-five per cent. ethylic alcohol. They are also useful in connection with camphor, as they form good solvents for the camphor. The liquid citric esters combine readily with the usual liquid menstrua employed in this art, and I recommend them for plastic, smooth, and slow-drying compounds. All these esters are decomposed by boiling under atmospheric pressure. They may, however, be distilled under diminished pressure, and the boiling-points vary with the pressure, as is well known. The rational formulæ hereinbefore given are amply sufficient for their identification.

The citric esters may be produced by any of the methods ordinarily employed for the production of such substances, but in practice it is preferable to dissolve citric acid in the alcohol and pass dry hydrochloric-acid gas into the solution as long as it is absorbed.

The liquid is then washed with water and dried over chlorid of calcium or other equivalent hygroscopic agent. The esters thus produced have a yellow color, but they are sufficiently pure for most purposes to which they are applied in the manufacture of pyroxylin compounds. If it is desired, however, to obtain the esters in a colorless state, the yellow liquids are subjected to distillation under diminished pressure.

Having thus described my invention, what I claim, and desire to secure by Letters Patent, is—

1. The process of making compounds of pyroxylin which consists in mixing pyroxylin with one or more of the citric esters of the monohydric monatomic series of aliphatic alcohols, substantially as set forth.

2. A new composition of matter containing pyroxylin and one or more of the citric esters of the monohydric monatomic series of aliphatic alcohols, substantially as described.

3. The process of making compounds of pyroxylin which consists in mixing pyroxylin with one or more of the citric esters of the monohydric monatomic series of aliphatic alcohols, and with one or more other solvents of pyroxylin, substantially as set forth.

4. A new composition of matter containing pyroxylin, one or more of the citric esters of the monohydric monatomic series of aliphatic alcohols, and one or more other solvents of pyroxylin, substantially as set forth.

5. A new composition of matter containing pyroxylin, one or more solid solvents of pyroxylin, and one or more of the citric esters of the monohydric monatomic series of aliphatic alcohols, substantially as described.

6. A new composition of matter, containing pyroxylin, camphor and one or more of the citric esters of the monohydric monatomic series of aliphatic alcohols, substantially as described.

7. A new composition of matter containing pyroxylin, triethyl citrate and acetanilid, substantially as described.

In witness whereof I have hereunto signed my name this 29th day of June, 1896.

JOHN H. STEVENS.

In presence of—
ABRAHAM MANNERS,
HORACE S. MILLER.